(12) United States Patent
Heiman et al.

(10) Patent No.: US 7,804,893 B2
(45) Date of Patent: Sep. 28, 2010

(54) FEEDBACK OF REINTERLEAVED CORRECTLY DECODED DATA BLOCK TO DECODER FOR USE IN ADDITIONAL CHANNEL DECODING OPERATIONS OF CHANNEL CODED WORD CONTAINING DATA BLOCK

(75) Inventors: Arie Heiman, Raanana (IL); Arkady Molev-Shteiman, Bnei Barak (IL)

(73) Assignee: Broadcom Corporation, Irvine, CA (US)

( * ) Notice: Subject to any disclaimer, the term of this patent is extended or adjusted under 35 U.S.C. 154(b) by 706 days.

(21) Appl. No.: 11/740,894

(22) Filed: Apr. 26, 2007

(65) Prior Publication Data
US 2008/0267330 A1 Oct. 30, 2008

(51) Int. Cl.
- *H03H 7/30* (2006.01)
- *H03H 7/40* (2006.01)
- *H03K 5/159* (2006.01)
- *H03G 11/04* (2006.01)
- *H04B 3/04* (2006.01)

(52) U.S. Cl. ........................ 375/229; 333/18
(58) Field of Classification Search ................. 375/229; 333/18
See application file for complete search history.

(56) References Cited

U.S. PATENT DOCUMENTS

| 6,334,197 | B1 * | 12/2001 | Eroz et al. | 714/701 |
| 6,925,587 | B2 * | 8/2005 | Eroz et al. | 714/701 |
| 7,388,910 | B2 * | 6/2008 | McKown | 375/232 |
| 7,526,687 | B2 * | 4/2009 | Eroz et al. | 714/701 |
| 7,643,538 | B2 * | 1/2010 | Currivan et al. | 375/144 |
| 2002/0087923 | A1 * | 7/2002 | Eroz et al. | 714/702 |
| 2005/0036541 | A1 * | 2/2005 | McKown | 375/233 |
| 2005/0166125 | A1 * | 7/2005 | Eroz et al. | 714/779 |
| 2007/0071139 | A1 * | 3/2007 | Arslan et al. | 375/340 |
| 2008/0059727 | A1 * | 3/2008 | Eroz et al. | 711/157 |
| 2008/0059847 | A1 * | 3/2008 | Eroz et al. | 714/701 |
| 2008/0065948 | A1 * | 3/2008 | Eroz et al. | 714/752 |
| 2008/0106816 | A1 * | 5/2008 | Silvus | 360/51 |
| 2008/0267330 | A1 * | 10/2008 | Heiman et al. | 375/360 |
| 2008/0298437 | A1 * | 12/2008 | Currivan et al. | 375/144 |
| 2009/0185612 | A1 * | 7/2009 | Mckown | 375/232 |

* cited by examiner

*Primary Examiner*—David C Payne
*Assistant Examiner*—Erin M File
(74) *Attorney, Agent, or Firm*—Garlick Harrison & Markison; Robert A. McLauchlan, III; Shayne X. Short

(57) ABSTRACT

The feedback of reinterleaved correctly decoded data blocks to a decoder is provided for use in channel decoding operations of channel coded word containing data block. Once a properly decoded data block has been determined, feedback of constraints on the estimated bit sequences decoded data characteristics to a turbo decoder assist in additional decoding operations. Estimated bit sequences may be selected from those trellises that pass through the constraint imposed by knowledge of re-interleaving properly decoded data blocks. This allows the decoder to generate solutions having a minimum probability of error that are also confined by the re-interleaved properly decoded data blocks.

27 Claims, 14 Drawing Sheets

FEEDBACK OF REINTERLEAVED CORRECTLY DECODED DATA BLOCK TO DECODER FOR USE IN ADDITIONAL CHANNEL DECODING OPERATIONS OF CHANNEL CODED WORD CONTAINING DATA BLOCK

TECHNICAL FIELD OF THE INVENTION

The present invention relates generally to cellular wireless communication systems, and more particularly to the transmitting of data over communications channels and devices.

BACKGROUND OF THE INVENTION

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions.

Wireless links between base stations and their serviced wireless terminals typically operate according to one (or more) of a plurality of operating standards. These operating standards define the manner in which the wireless link may be allocated, setup, serviced, and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

Many different communication channels are available. Communications channels allow wired or wireless communications for the transmission of audio, video and data. These wired, wireless and optical communication channels may include fiber optics, laser based communications, satellite based communications, cellular communications, cable communications, radio frequency (RF) and traditional wired and wireless communications. These communications allow for the delivery of video, Internet, audio, voice, and data transmission services throughout the world. By providing communication channels with large bandwidth capacity, communications channels facilitate the exchange of information between people in an ever shrinking global environment.

As the amount of data exchanged increases, the ability to accurately read data from the channels is adversely effected. One factor affecting the ability to accurately read this data is inter symbol interference (ISI). ISI is the process by which nearby symbols interact with each other in a detrimental way. To allow higher data exchanges within a physical channel, one solution in telecommunications and data storage has been to intentionally write symbols close together and utilize the Viterbi algorithm (or any other sequence detector) and knowledge of how the symbols interact to recover the bit sequence from a noisy analog signal. When applying this solution, the data interferes in a controlled manner and additionally becomes distorted by noise and/or other interfering signals. This noise and interfering signals must be overcome in order to properly read back the pattern of "1's" and "0's" correctly. The Viterbi algorithm is an efficient dynamic programming algorithm that finds the most likely sequence of bits received by comparing a received sequence of points sampled from the analog read back waveform to every possible sequence of bits transmitted. This best sequence is referred to as the "best path through the trellis." The trellis tracks all possible paths and consists of states, which help track the bit decisions associated with the path through them. Other techniques design symbols that are more robust against ISI. Decreasing the symbol rate (the "baud rate"), and keeping the data bit rate constant (by coding more bits per symbol), reduces inter symbol interference.

Thus, a need exists for improvements in interference cancellation.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Figure 1:
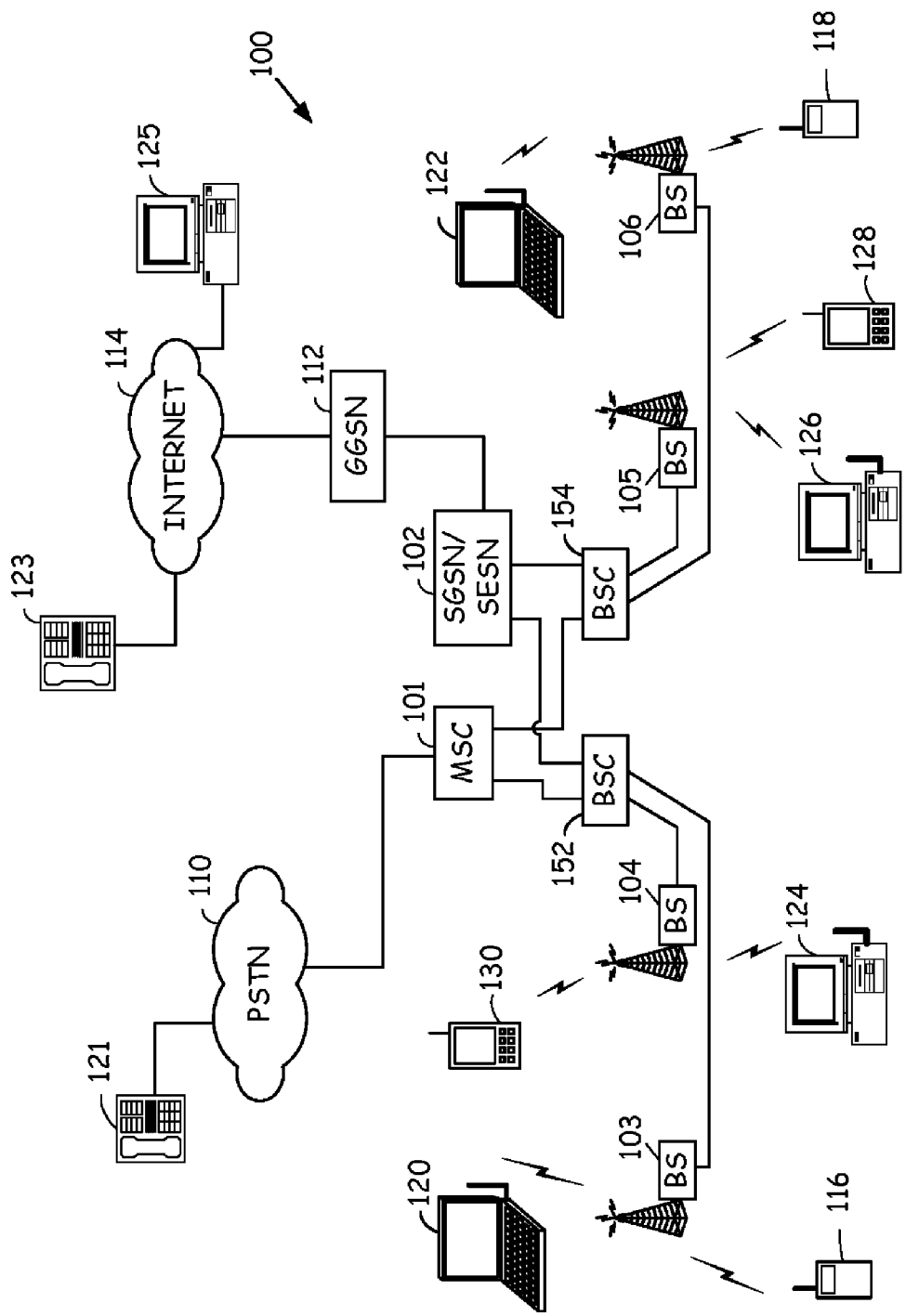
FIG. 1 is a system diagram illustrating a portion of a cellular wireless communication system that supports wireless terminals operating according to the present invention.

Preferred embodiments of the present invention are illustrated in the FIGs., like numerals being used to refer to like and corresponding parts of the various drawings.

Embodiments of the present invention provide a method that leverages knowledge of the ideal bit sequence to improve the performance of any sequence detector, such as but not limited to a Viterbi Algorithm, a "Soft-Output Viterbi Algorithm (SOVA)" or Bahl, Cocke, Jelinek, and Raviv (BCJR) detector. This improved performance results by constraining the sequence detector when the sequence detector has read a known pattern. One set of embodiments control or limit the effects of interference on a signal.

One set of embodiments of the present invention provides a method to control in order to allow greater data exchange at reduced cost within a physical channel. This method involves reading an analog waveform from the physical channel. The phase of this analog waveform is determined and the analog waveform is sampled. This sample sequence is equalized (filtered) and sent to a sequence detector which compares the received sequence to all possible transmitted sequences, generating a path through a trellis that represents the estimated sequence. That trellis path may pass through known states at certain times. For example, the known bit sequence may include a preamble, data, and postamble. Knowledge of the ideal or actual bit sequences at certain time instances makes it possible to remove some of the trellis paths under consideration, hence improving performance of the sequence detector. Any dis-allowed bit sequences (i.e. trellis paths) may be pruned from the set of possible bit sequences based on knowledge of the ideal or actual bit sequence. Then the sample sequence may be compared to a set of possible bit sequences to select a decoded bit sequence.

Gaussian Minimum Shift Keying (GMSK) modulation systems can be modeled as a single-input two-output system in real domain. This model is a virtual single transmit 2 receive system. Interference cancellation techniques for multiple antennas can be applied to GMSK systems as provided by embodiments of the present invention that substantially addresses the above identified needs as well as other needs. The present invention provides a channel decoder processing module equalizer processing module operable to provide enhanced decoding results, associated with received radio frequency (RF) burst(s). This channel decoder processing module includes equalizer and decoding processing branches. One equalizer processing branch may be trained based upon known training sequences and equalize the received RF burst. These results are then further processed and used to produce estimated bit sequences. The decoding processing module then prunes the set of possible bit sequences based on knowledge of the estimated bit sequence and physical constraints associated with the received RF burst to produce an output that results in improved processing of the received RF bursts.

FIG. 1 is a system diagram illustrating a portion of a cellular wireless communication system 100 that supports wireless terminals operating in accordance with embodiments of the present invention. Cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links can result in co-channel and adjacent channel signals that may appear as noise which may be colored or white. As previously stated, this noise may interfere with the desired signal of interest. Hence, the present invention provides techniques for canceling such interference in poor signal-to-noise ratio (SNR) or low signal-to-interference ratio (SIR) environments.

These wireless links may support digital data communications, VoIP communications, and other digital multimedia communications. The cellular wireless communication system 100 may also be backward compatible in supporting analog operations as well. The cellular wireless communication system 100 may support the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communication techniques that address the identification and cancellation of interfering communications.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard. These wireless terminals 116-130 also support the GSM standard and may support the GPRS standard.

Figure 2:
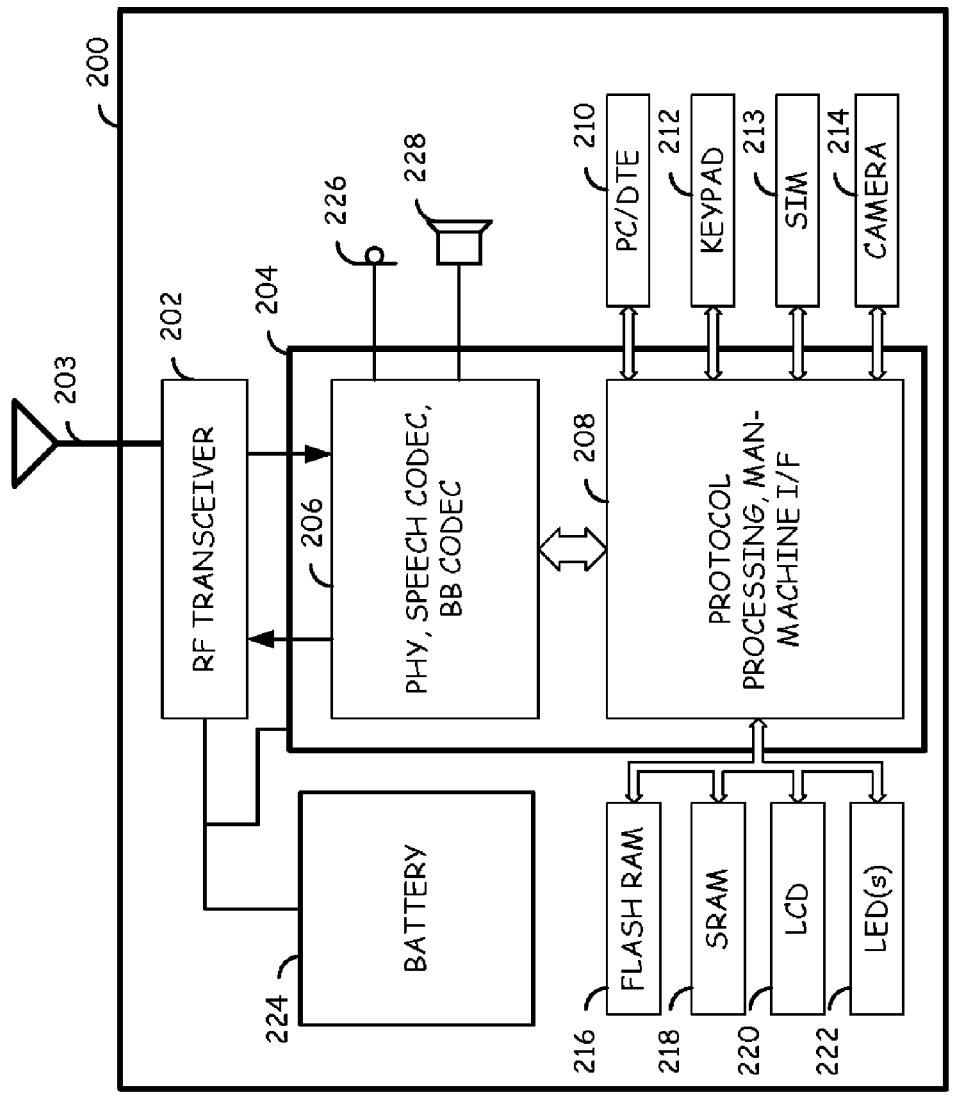
FIG. 2 is a block diagram functionally illustrating a wireless terminal constructed according to the present invention.

FIG. 2 is a block diagram functionally illustrating wireless terminal 200. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

RF transceiver 202 couples to an antenna 203, to the digital processing components 204, and also to battery 224 that powers all components of wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to various components such as, but not limited to, Personal Computing/Data Terminal Equipment interface 210, keypad 212, Subscriber Identification Module (SIM) port 213, a camera 214, flash RAM 216, SRAM 218, LCD 220, and LED(s) 222. When camera 214 and LCD 220 are present, these components may support either/both still pictures and moving pictures. Thus, the wireless terminal 200 of FIG. 2 may be operable to support video services as well as audio services via the cellular network.

Figure 3:
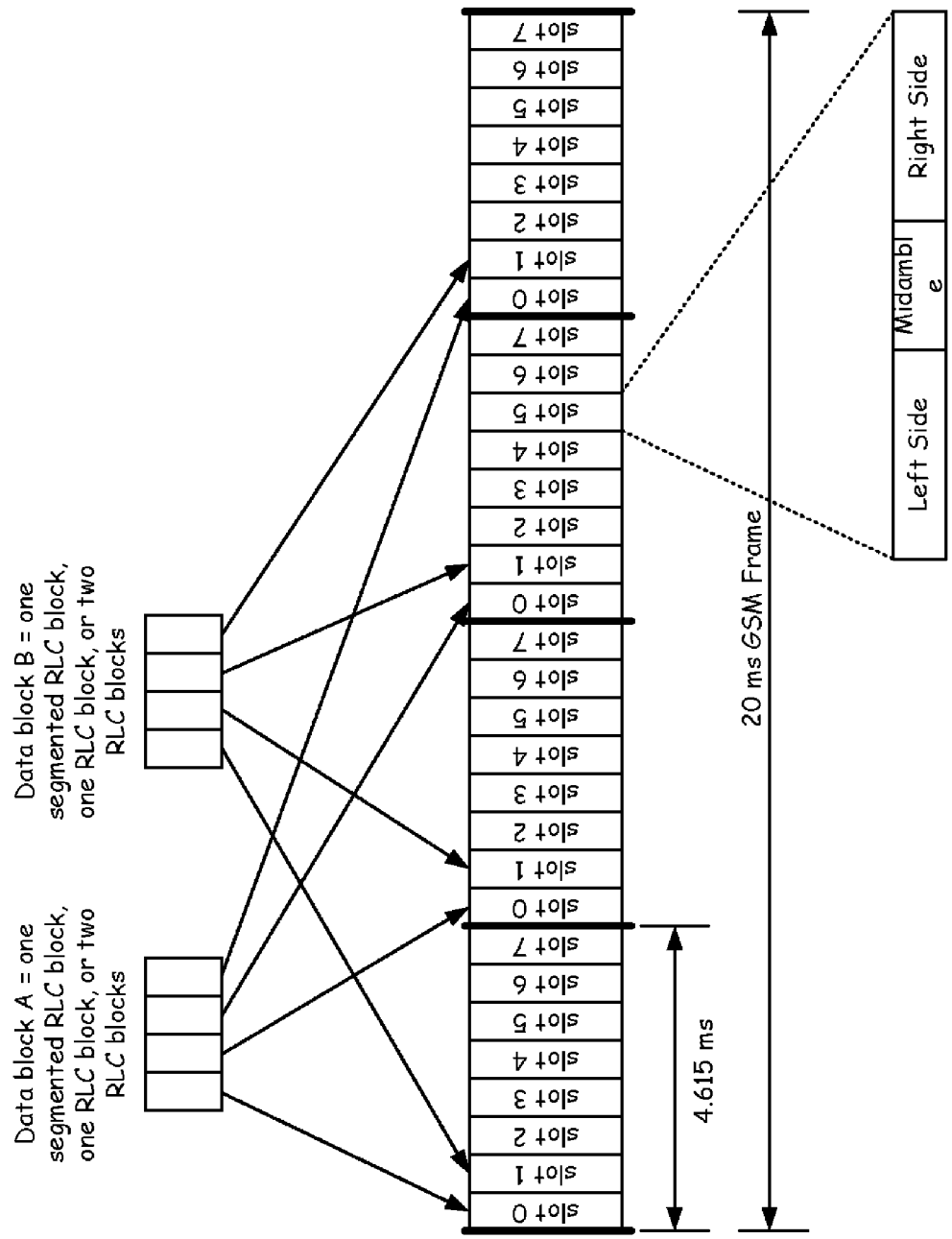
FIG. 3 is a block diagram illustrating the general structure of a GSM frame and the manner in which data blocks are carried by the GSM frame.

FIG. 3 is a block diagram illustrating the general structure of a GSM frame and the manner in which data blocks are carried by the GSM frame. The GSM frame, 20 ms in duration, is divided into quarter frames, each of which includes eight time slots, time slots 0 through 7. Each time slot is approximately 625 us in duration, includes a left side, a right side, and a midamble. The left side and right side of an RF burst of the time slot carry data while the midamble is a training sequence.

RF bursts of four time slots of the GSM frame carry a segmented RLC block, a complete RLC block, or two RLC blocks, depending upon a supported Modulation and Coding Scheme (MCS) mode. For example, data block A is carried in slot 0 of quarter frame 1, slot 0 of quarter frame 2, slot 0 of quarter frame 3, and slot 0 of quarter frame 3. Data block A may carry a segmented RLC block, an RLC block, or two RLC blocks. Likewise, data block B is carried in slot 1 of quarter frame 1, slot 1 of quarter frame 2, slot 1 of quarter frame 3, and slot 1 of quarter frame 3. The MCS mode of each set of slots, i.e., slot n of each quarter frame, for the GSM frame is consistent for the GSM frame but may vary from GSM frame to GSM frame. Further, the MCS mode of differing sets of slots of the GSM frame, e.g., slot 0 of each quarter frame vs. any of slots 1-7 of each quarter frame, may differ. The RLC block may carry voice data or other data.

Figure 4:
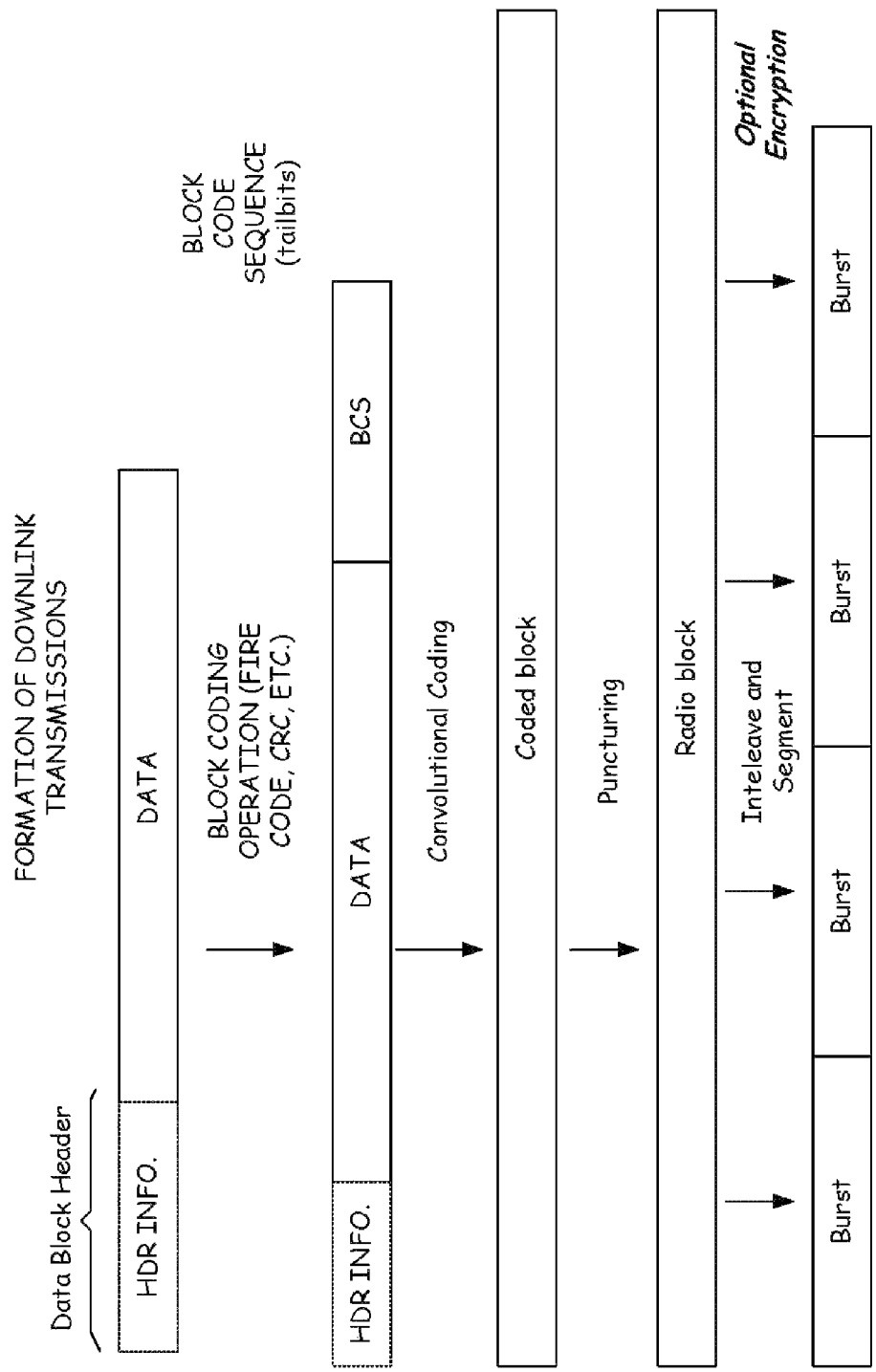
FIG. 4 is a block diagram illustrating the formation of down link transmissions.

FIG. 4 generally depicts the various stages associated with mapping data into RF bursts. Data is initially uncoded and maybe accompanied by a data block header. Block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the data. In CS-1, the header and data are coded together using block coding and convolutional coding. In non-CS-1 coding schemes, the header and data information are often coded separately.

Fire codes allow for either error correction or error detection. Fire Codes are a shortened binary cyclic code that appends redundancy bits to bits of the data Header and Data. The pure error detection capability of Fire Coding may be sufficient to let undetected errors go through with only a probability of $2^{-40}$. After block coding has supplemented the Data with redundancy bits for error detection, calculation of additional redundancy for error correction to correct the transmissions caused by the radio channels. The internal error correction or coding scheme is based on convolutional codes.

Some redundant bits generated by the convolutional encoder may be punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Figure 5:
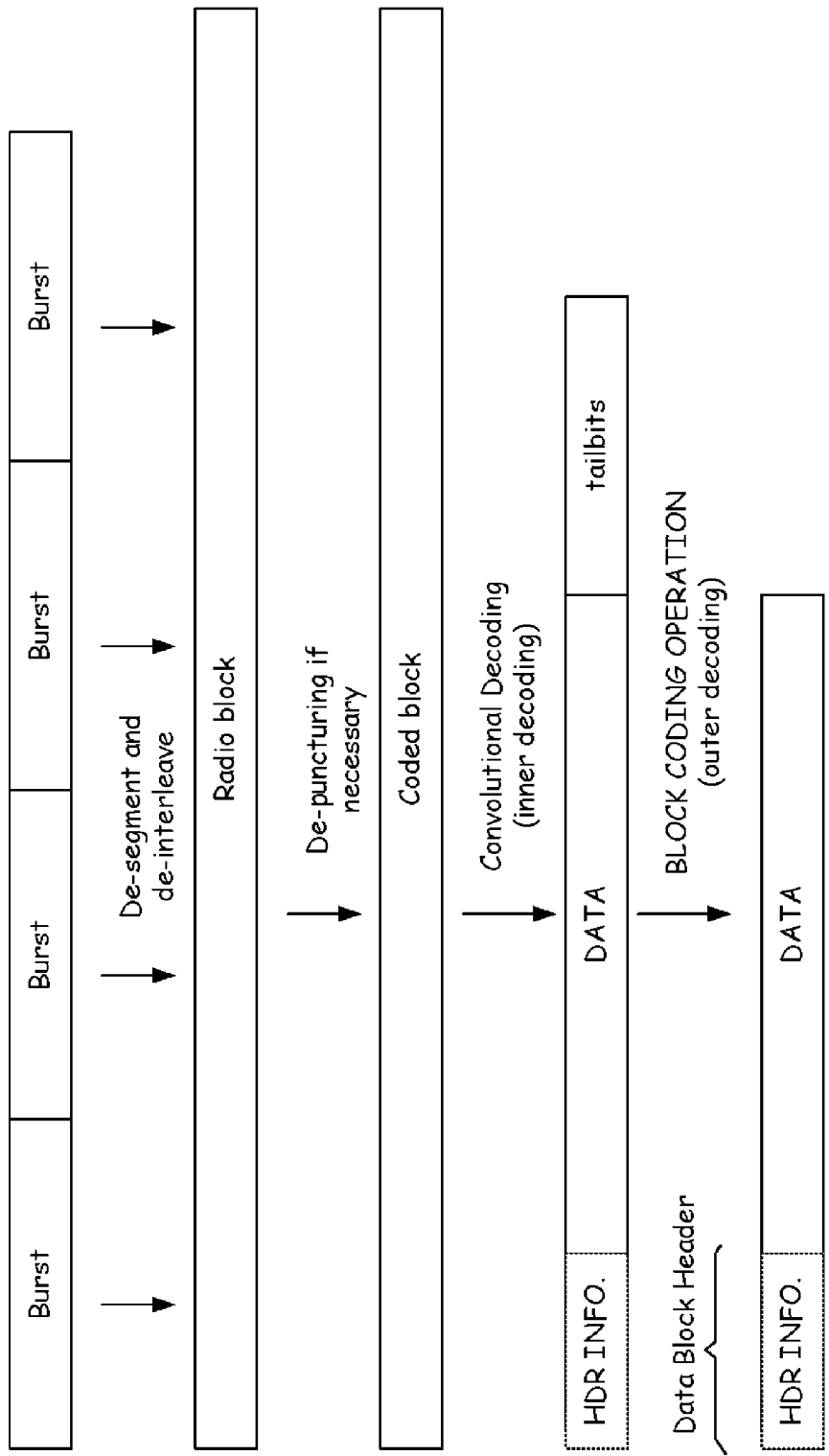
FIG. 5 is a block diagram illustrating the stages associated with recovering a data block from a series of RF bursts.

FIG. 5 is a block diagram that generally depicts the various stages associated with recovering a data block from a RF burst(s). Four RF bursts typically make up a data block. These bursts are received and processed. Once all four RF bursts have been received, the RF bursts are combined to form an encoded data block. The encoded data block is then depunctured (if required), decoded according to an inner decoding scheme, and then decoded according to an outer decoding scheme. The decoded data block includes the data block header and the data. Depending on how the data and header are coded, partial decoding may be possible to identify data.

Figure 6:
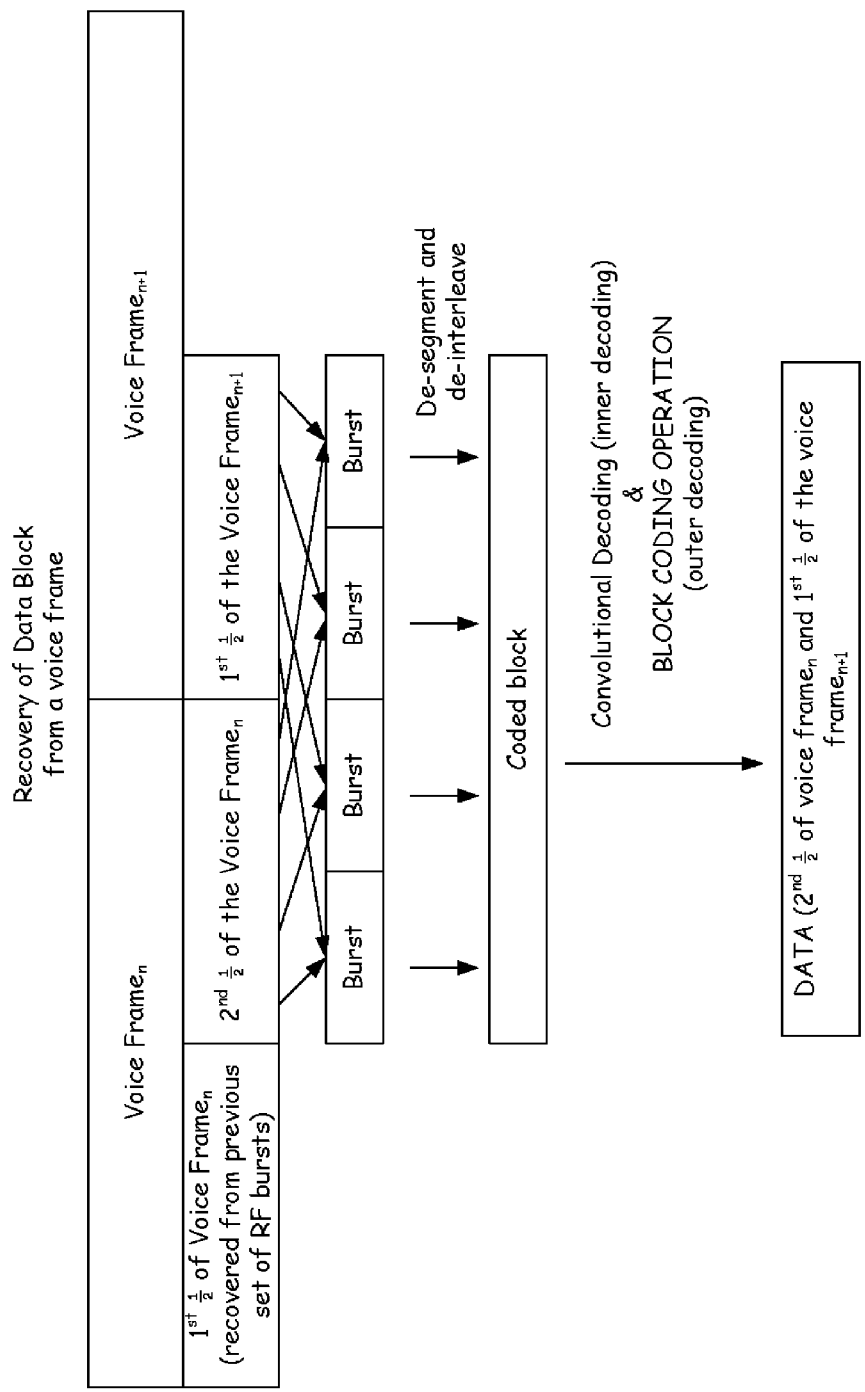
FIG. 6 is a block diagram illustrating the stages associated with recovering a voice data from a series of RF bursts.

FIG. 6 is a block diagram that depicts the various stages associated with recovering data from a transmitted voice frame. This is similar to the process described with reference to FIG. 5. Typically a 20 millisecond voice frame is transmitted, wherein the first half of the 20 millisecond voice frame is transmitted within a first series of RF bursts and the second half of the voice frame is transmitted with a second series of RF bursts. A series of four RF bursts is shown as being off-set by 10 milliseconds from the first voice frame, Voice Frame$_n$, wherein the second half of Voice Frame$_n$ and the first half of the subsequent voice frame, Voice Frame$_{n+1}$, are coded and interleaved into the series of four RF bursts. When the four RF bursts are processed, the coded block produced produces a data stream that comprises the second half of Voice Frame$_n$ and the first half of Voice Frame$_{n+1}$. The first half of Voice Frame$_n$, stored within memory, may be combined with the second half of Voice Frame$_n$ to produce the data associated with a valid Voice Frame$_n$.

Figure 7:
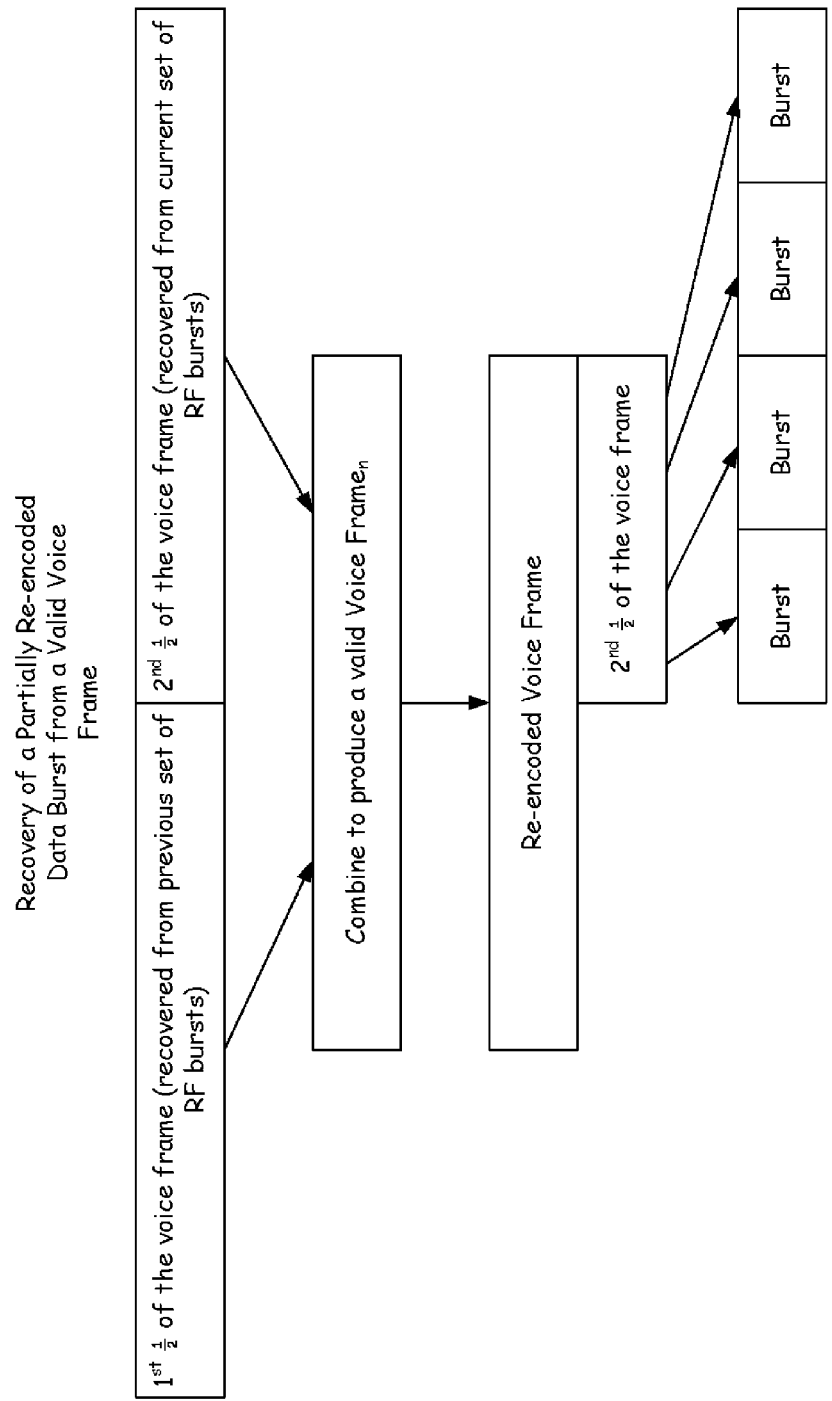
FIG. 7 is a block diagram illustrating the stages associated with recovering a burst from a data or voice frame.

Re-encoding the data associated with a valid Voice Frame$_n$, as described with reference to FIG. 7, may result in an at least partially re-encoded data bursts that may be used to by the decoder processing module to prune a set of possible bit sequences based on knowledge of the interleaved bit sequence. The decoder processing module then compares the estimated sample sequence to the set of possible bit sequences to select a decoded bit sequence. As previously stated, the first half of the voice frame recovered from a previous set of RF bursts and the second half of the voice frame recovered from the current set of RF bursts are combined to produce the data associated with a voice frame. This voice frame may be validated and corrected using cycle redundancy checks in order to produce a valid voice frame. This valid voice frame may then be re-encoded. However, only the second half of the re-encoded Voice Frame$_n$ is used to partially recreate the burst(s). The second half of re-encoded Voice Frame$_n$ may be segmented and interleaved to produce a series of partially encoded RF bursts. Since the processing of the second half of the Voice Frame$_{n+1}$ has not occurred, the RF bursts are only partially re-encoded. Since Voice Frame$_{n+1}$ has not been validated, the first half of a re-encoded Voice Frame$_{n+1}$ is not possible and is not used to recreate the burst (s). The partially re-encoded burst(s), based on Voice Frame$_n$, taken together with the known training sequences are operable to prune a set of possible bit sequences based on knowledge of the interleaved bit sequence.

Figure 8A:
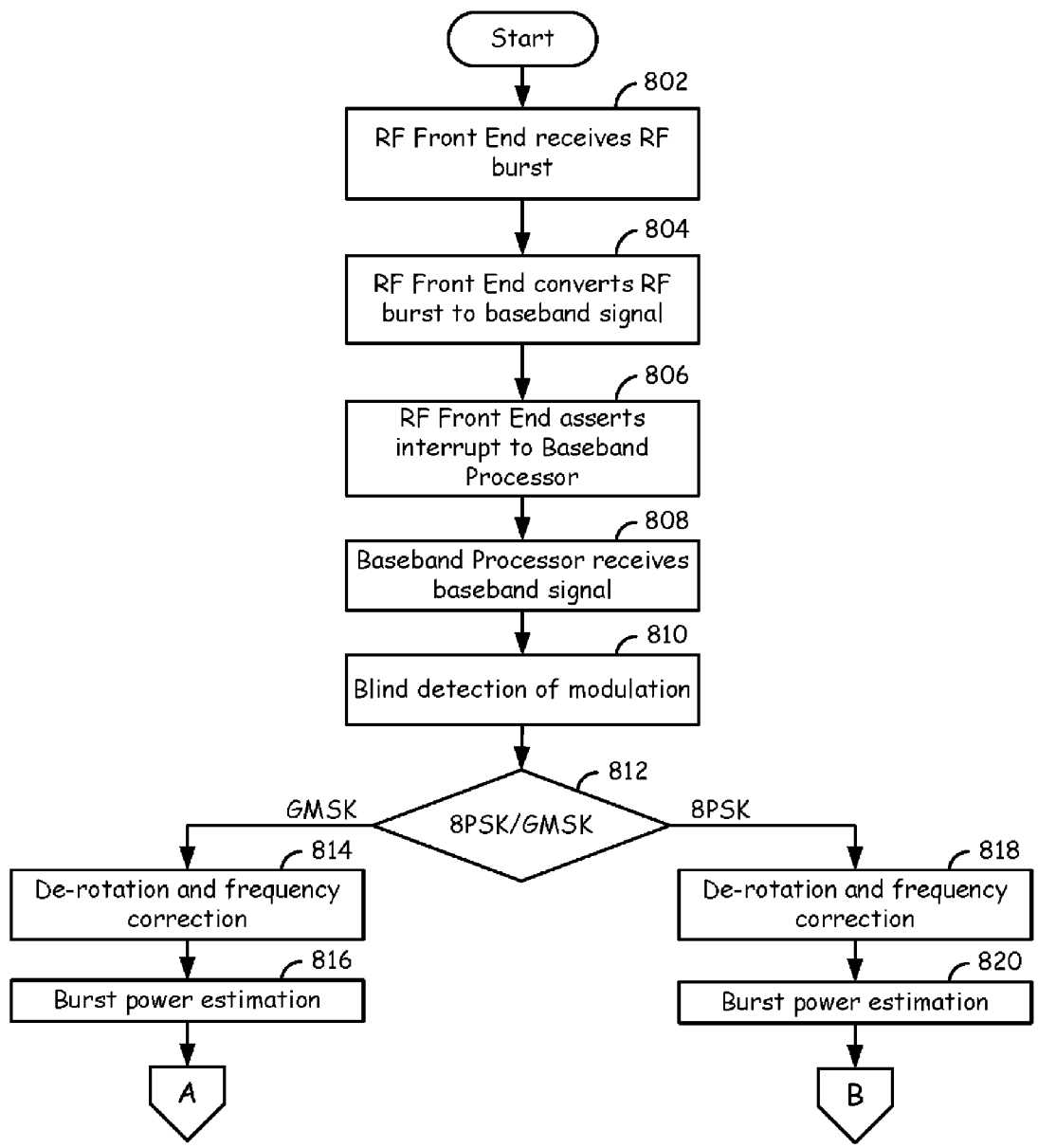
FIGS. 8A and 8B are flow charts illustrating operation of a wireless terminal in receiving and processing a RF burst.
Figure 8B:
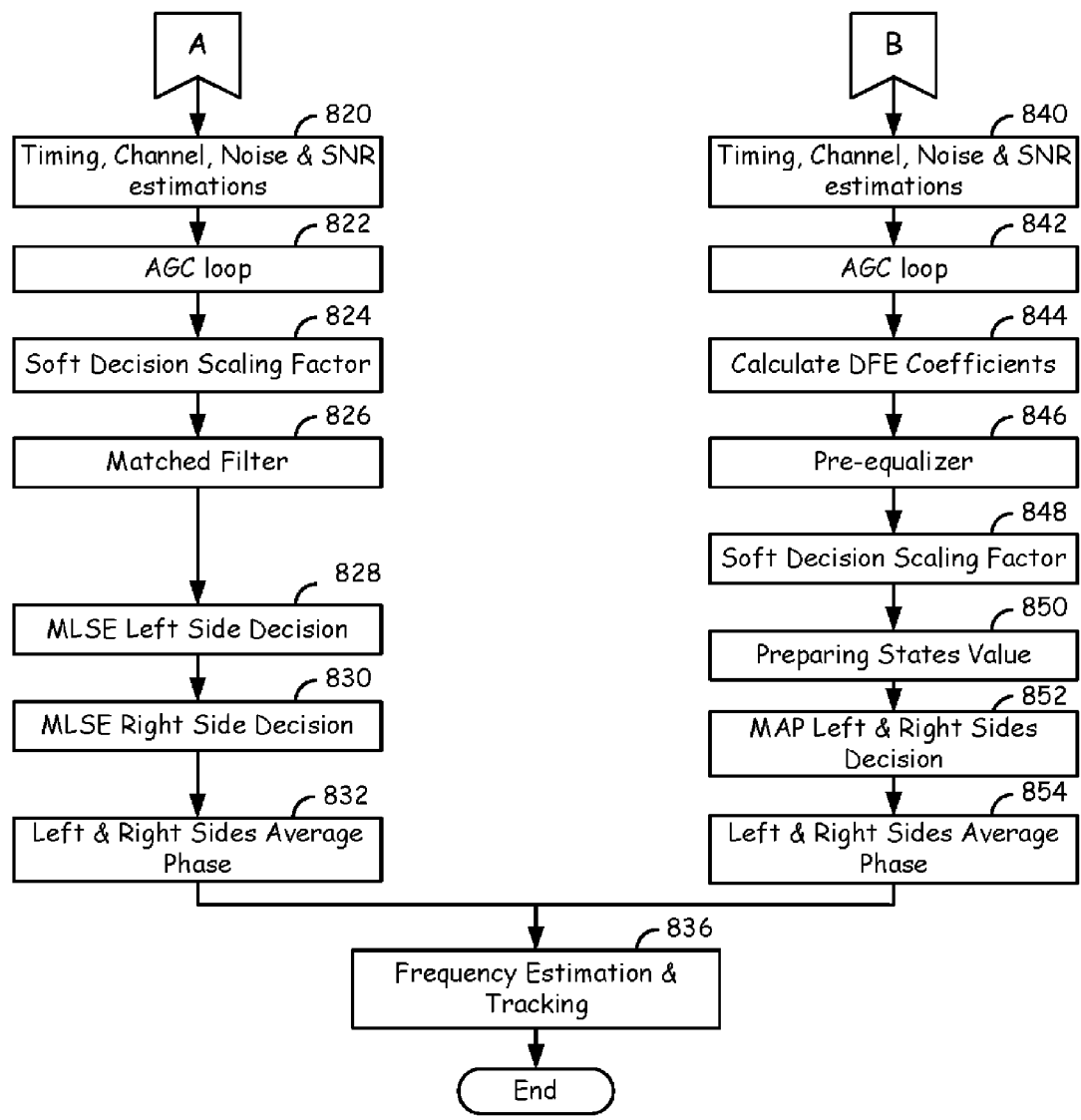

FIGS. 8A and 8B are flow charts illustrating operation of a wireless terminal 200 in receiving and processing a RF burst. The operations illustrated in FIGS. 8A and 8B correspond to a single RF burst in a corresponding slot of GSM frame. The RF front end, the baseband processor, and the equalizer processing module perform these operations. These operations are generally called out as being performed by one of these components. However, the split of processing duties among these various components may differ without departing from the scope of the present invention.

Referring particular to FIG. 8A, operation commences with the RF front end receiving an RF burst in a corresponding slot of a GSM frame (step 802). The RF front end then converts the RF burst to a baseband signal (step 804). Upon completion of the conversion, the RF front end sends an interrupt to the baseband processor (step 806). Thus, as referred to in FIG. 8A, the RF front end performs steps 802-806.

Operation continues with the baseband processor receiving the baseband signal (step 808). In a typical operation, the RF front end, the baseband processor, or modulator/demodulator will sample the analog baseband signal to digitize the baseband signal. After receipt of the baseband signal (in a digitized format), the baseband processor performs blind detection of a modulation format of the baseband signal of step 810. This blind detection of the modulation format determines the modulation format of the corresponding baseband signal. In one particular embodiment according to the GSM standard, the modulation format will be either Gaussian Minimum Shift Keying (GMSK) modulation or Eight Phase Shift Keying (8PSK) modulation. The baseband processor makes the determination (step 812) and proceeds along one of two branches based upon the detected modulation format.

For GMSK modulation, the baseband processor performs de-rotation and frequency correction of the baseband signal at step 814. Next, the baseband processor performs burst power estimation of the baseband signal at step 816. Referring now to FIG. 8B via off page connector A, the baseband processor next performs timing, channel, noise, and signal-to-noise ratio (SNR) estimation at step 820. Subsequently, the baseband processor performs automatic gain control (AGC) loop calculations (step 822). Next, the baseband processor performs soft decision scaling factor determination on the baseband signal (step 824). After step 824, the baseband processor performs matched filtering operations on the baseband signal at step 826.

Steps 808-826 are referred to hereinafter as pre-equalization processing operations. With the baseband processor performing these pre-equalization processing operations on the baseband signal it produces a processed baseband signal. Upon completion of these pre-equalization processing operations, the baseband processor issues a command to the equalizer module.

The equalizer module upon receiving the command, prepares to equalize the processed baseband signal based upon the modulation format, e.g., GMSK modulation or 8PSK modulation. The equalizer module receives the processed baseband signal, settings, and/or parameters from the baseband processor and performs Maximum Likelihood Sequence Estimation (MLSE) equalization on the left side of the baseband signal at step 828. As was shown previously with reference to FIG. 3, each RF burst contains a left side of data, a midamble, and a right side of data. Typically, at step 828, the equalizer module equalizes the left side of the RF burst to produce soft decisions for the left side. Then, the equalizer module equalizes the right side of the processed baseband signal at step 830. The equalization of the right side produces a plurality of soft decisions corresponding to the right side. The burst equalization is typically based of known training sequences within the bursts. However, the embodiments of the present invention may utilize re-encoded or partially re-encoded data to improve the equalization process. This may take the form of an iterative process wherein a first branch performs burst equalization and a second module performs a second equalization based on the result obtained with the first branch over a series of RF bursts.

The equalizer module then issues an interrupt to the baseband processor indicating that the equalizer operations are complete for the RF burst. The baseband processor then receives the soft decisions from the equalizer module. Next, the baseband processor determines an average phase of the left and right sides based upon the soft decisions received from the equalizer module at step 832. The baseband processor then performs frequency estimation and tracking based upon the soft decisions received from the equalizer module at step 836. The operations of step 832, or step 854 and step 836 are referred to herein as "post-equalization processing." After operation at step 836, processing of the particular RF burst is completed.

Referring again to FIG. 8A, the baseband processor and equalizer module take the right branch from step 812 when an 8PSK modulation is blindly detected at step 810. In the first operation for 8PSK modulation, the baseband processor performs de-rotation and frequency correction on the baseband signal at step 818. The baseband processor then performs burst power estimation of the baseband signal at step 820. Referring now to FIG. 8B via off page connector B, operation continues with the baseband processor performing timing, channel, noise, and SNR estimations at step 840. The baseband processor then performs AGC loop calculations on the baseband signal at step 842. Next, the baseband processor calculates Decision Feedback Equalizer (DFE) coefficients that will be used by the equalizer module at step 844. The baseband processor then performs pre-equalizer operations on the baseband signal at step 846. Finally, the baseband processor determines soft decision scaling factors for the baseband signal at step 848. Steps 818-848 performed by the baseband processor 30 are referred to herein as "pre-equalization processing" operations for an 8PSK modulation baseband signal. Upon completion of step 648, the baseband processor issues a command to equalizer module to equalize the processed baseband signal.

Upon receipt of the command from the baseband processor, the equalizer module receives the processed baseband signal, settings, and/or parameters from the baseband processor and commences equalization of the processed baseband signal. The equalizer module first prepares state values that it will use in equalizing the 8PSK modulated processed baseband signal at step 850. In the illustrated embodiment, the equalizer module uses a Maximum A posteriori Probability (MAP) equalizer. The equalizer module then equalizes the left and right sides of the processed baseband signal using the MAP equalizer to produce soft decisions for the processed baseband signal at step 852. Upon completion of step 854, the equalizer module issues an interrupt to the baseband processor indicating its completion of the equalizing the processed baseband signal corresponding.

The baseband processor then receives the soft decisions from the equalizer module. Next, the baseband processor determines the average phase of the left and right sides of the processed baseband signal based upon the soft decisions (step 854). Finally, the baseband processor performs frequency estimation and tracking for the soft decisions (step 836). The operations of steps 854 and 836 are referred to as post-equalization processing operations. From step 836, operation is complete for the particular RF burst depicts the various stages associated with recovering a data block from an RF Burst.

While the operations of FIGS. 8A and 8B are indicated to be performed by particular components of the wireless terminal, such segmentation of operations could be performed by differing components. For example, the equalization operations could be performed by the baseband processor or system processor in other embodiments. Further, decoding operations could also be performed by the baseband processor or the system processor in other embodiments.

Figure 9:
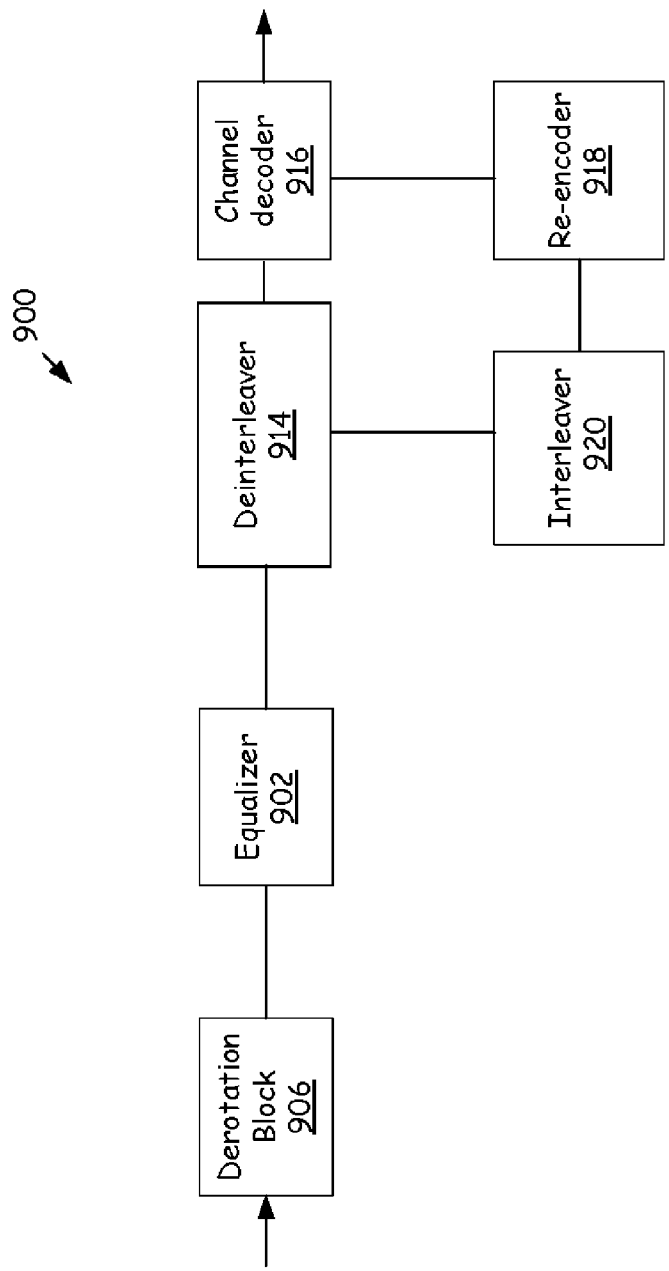
FIG. 9 is a block diagram illustrating components of a equalization component according to an embodiment of the present invention.

FIG. 9 is a block diagram illustrating the structure of one embodiment of an equalizer processing module 900 operable to provide enhanced decoding performance in accordance with embodiments of the present invention. The components illustrated in FIG. 9 may be hardware components, software components executed by a processor, e.g., 206 or 208 of FIG. 2, or a combination of hardware components and software components. Equalizer processing module 900 includes an equalizer processing branch 902, deinterleaver 914, interleaver 920, re-encoder 918 and channel decoder 916. Derotation block 906 receives In phase (I) and Quadrature (Q) components of a baseband burst. This baseband burst corresponds to RF burst(s), which were described with reference to FIGS. 3-7. Derotation block 906 derotates received I and Q burst samples and produces I and Q burst samples ("bursts"). In one embodiment, first equalizer processing branch 902 may include a burst equalizer. These samples may be later equalized in accordance with the embodiments of the present invention with other samples making up a data packet, e.g., RLC packet. The iterative processes of the second equalizer processing branch may be performed in addition to the burst level equalization during certain operating conditions.

Burst equalizers, may include I and Q Finite Impulse Response (FIR) filters and Minimum Least Squares Estimation (MLSE) equalizer that operate upon each burst received from derotation block 906. These components may be trained using known Training Sequence(s) (TS), within the midamble received with each burst. Alternately, these components could be trained over multiple bursts. Equalizer processing branch 902 produces soft decisions wherein multiple soft decisions represent each data bit prior to decoding. Each soft sample is provided to deinterleaver 914 which in turn provides the deinterleaved soft samples to channel decoder 916. Channel decoder 916 decodes a data frame from the soft samples (i.e. the multiple soft sample(s) that represent each data bit are decoded by the channel decoder to produce hard bits after decoding).

The data frame produced by channel decoder 916 may be validated and re-encoded using re-encoder 918 in order to produce re-encoded data bits. Interleaver 920 receives the re-encoded data bits to produce a re-encoded data burst(s). Partially re-encoded data burst(s), along with known training sequence(s), may then be used to by the channel decoder to prune the set of allowable bit sequences that the output of the channel decoder is selected from.

Addressing these issues may allow an increase in the amount of data transmitted within communication channels. These methods involve reading an analog waveform from a physical media or communication channel. Then a sample sequence may be derived from that waveform. This sample sequence represents a bit sequence having predetermined known bit sub-patterns embedded in it. For example, the bit sequence may include a preamble, sync mark, data, and postamble. Because a sequence detector within the channel decoder compares the received pattern to the patterns generated by every possible bit sequence, knowledge of the ideal or actual bit sequences and their components allows us to reduce the set of possible bit sequences considered. Leveraging knowledge of known patterns allows a sequence detector to "enforce" the existence of these known patterns when decoding the sample sequence to produce a bit sequence. The sample sequence is sent to the sequence detector (i.e. Viterbi algorithm) where the sequence detector determines the bit sequence most likely represented by the sample sequence. The set of possible bit sequences may be pruned based on knowledge of the ideal bit sequence. Then the sample sequence may be compared to a reduced set of possible bit sequences to select the decoded bit sequence.

To identify the bit sequence, the channel reads the analog waveform from the physical channel. This sample sequence is sent to a sequence detector which compares the received sequence to all possible transmitted sequences, generating a path through a trellis that represents the estimated sequence. That trellis path may pass through known states at certain times. For example, the known bit sequence may include the preamble, sync mark, data, and postamble as discussed with reference to FIGS. 4, 5 and 6. Knowledge of the ideal bit sequences at certain time instances makes it possible to remove some of the paths (i.e. possible bit sequences) under consideration, hence improving performance of the sequence detector. Dis-allowed bit sequences may be pruned from the set of possible bit sequences. Then the sample sequence may be compared to a set of possible bit sequences to select a decoded bit sequence. The pruning of the dis-allowed bit sequences then reduces the number of bit sequences within the set of possible bit sequences to be compared to the estimated sample sequence in order to properly select the decoded bit sequence.

Pruning the dis-allowed bit sequence may be done based on knowledge of every portion of the above-described data sector. First the set of possible bit sequences may be pruned based on the preamble.

For example, bit sequences (states or trellises) not following the predetermined bit sequence can be pruned (removed, reprioritized, or labeled as dis-allowed) from the set of possible bit sequences. Next the set of possible bit sequences may be further pruned based on knowledge of the sync mark. The sync mark may have an exact predetermined sequence. The bit sequences (trellis paths) within the set of possible bit sequences that do not conform to the constraints of the sync mark may then be removed. Next, code words within the data portion of the bit sequence allow the set of possible bit sequences to be further pruned. For example, the parity of the code words may be known. This would allow those bit sequences not having code words with the proper parity to be pruned. The postamble, which comprises a predetermined bit sequence, allows further pruning of the allowed bit sequences.

Any sequence detector, such as, but not limited to a Viterbi Algorithm, a SOVA or BCJR detector, may then be employed to determine the bit sequence. Embodiments of the present invention prune the set of possible bit sequences with knowledge of known pattern(s) within the ideal bit sequence to improve system performance. This knowledge eliminates the need for the sequence detector to examine every possible bit sequence. Thus, the decoding process is streamlined even where a small number of possible bit sequences are removed.

Figure 10:
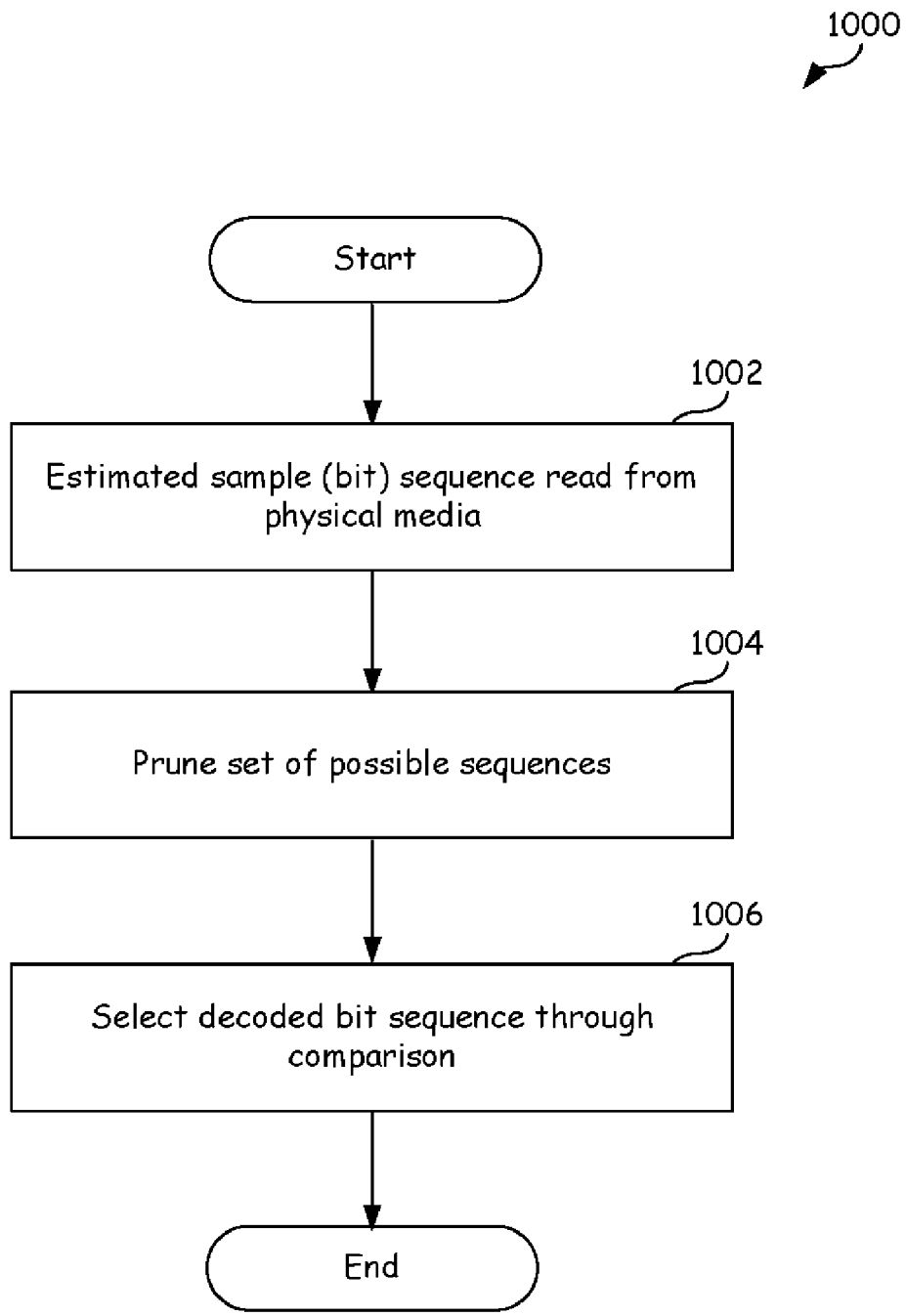
FIG. 10 provides a logic flow diagram of a method to control interference in accordance with embodiments of the present invention.

FIG. 10 provides a logic flow diagram of a method to control, limit, or overcome interference in accordance with embodiments of the present invention. Operations 1000 begin with Step 1002 where a sample sequence is determined by the channel based on the analog waveform read from the communication channel. The bit sequence that the sample sequence represents may have a pre-defined format similar to that discussed with reference to FIGS. 4, 5 and 6. This sample sequence is equalized (filtered) and sent to a sequence detector. In general, a sequence detector compares the received sample sequence to every possible sequence. However, embodiments of the present invention streamline this process by pruning (i.e. removing) dis-allowed bit sequences from the set of possible sequences in step 1004.

The set of possible bit sequences may be pruned based on knowledge of the ideal or actual bit sequence at certain time instants. Thus, with specific knowledge of the preamble, sync mark, data, and postamble one can prune the available (i.e. reduce the number of) possible bit sequences. In Step 1006 the sample sequence may be compared to the reduced set of possible bit sequences in order to select a bit sequence as the decoded bit sequence.

Figure 11:
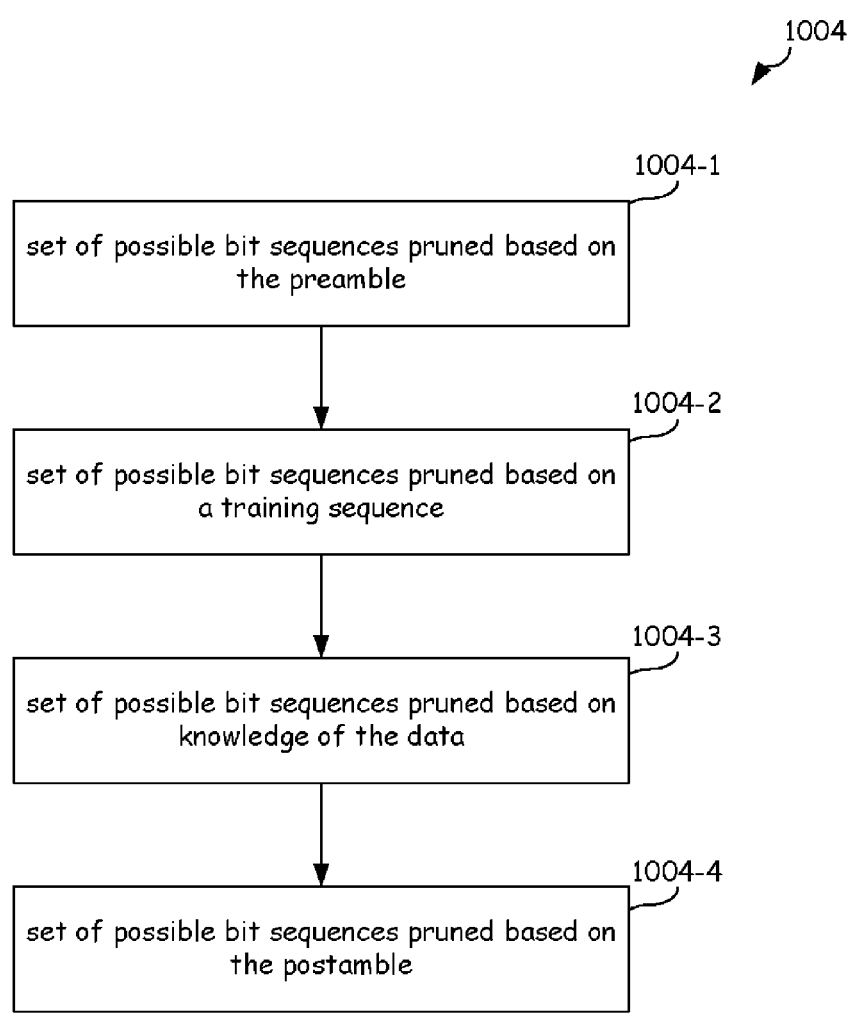
FIG. 11 lists how pruning of the set of possible bit sequences may be divided into multiple steps in accordance with embodiments of the present invention.

As shown in FIG. 11, pruning of the set of possible bit sequences may be based on any known pattern within the ideal bit sequence to improve system performance. For example, for a bit sequence having a format as described with reference to FIGS. 4, 5 and 6, the pruning of the set of possible bit sequences may be based on knowledge of four portions of the ideal bit sequence. As shown here, Step 1004 of FIG. 10 is divided into four components. In step 1004-1 the set of possible bit sequences may be pruned based on knowledge of the preamble. The preamble may be made of a pre-determined bit sequence such as the bit pattern 11001100.... In Step 1004-2 the set of possible bit sequences may then be further pruned based on specific knowledge of a pre-determined bit sequence located at the end of the preamble. In Step 1004-3 the set of possible bit sequences may be pruned based on parity of data code words within the data portion of the bit sequence. For example, allowable bit sequences having data code words with odd parity may be excluded in favor of those having even parity. Further, more than one date code word may be present within the data. Therefore, there may be multiple constraints within the data to further prune or reduce the set of possible bit sequences. Then, in Step 1004-4 the set of possible bit sequences may be pruned based on the pre-determined bit sequence of the post-amble. By pruning the choices, i.e. reducing the number of possible bit sequences, a sequence detector such as but not limited to the decoding technique provided by the Viterbi algorithm may show significantly improved decisions in the region of the pruning.

Returning to FIG. 11 pruning is the removal of dis-allowed bit sequences. For example, some algorithms may compare the distance between the sample sequence and possible bit sequence(s) and then select the possible bit sequence having the least distance from the sample sequence. Where the distance between the sample sequence and possible bit sequence(s) is large, these possible bit sequence(s) may be automatically reprioritized as a dis-allowed bit sequence (i.e. essentially being removed from the set of possible bit sequences). Dis-allowed bit sequences may be removed from the set of possible bit sequence(s) by setting the distance between the estimated and dis-allowed bit sequence to a large value. This eliminates the need for the sequence detector to actually determine a distance between the sample sequence and possible bit sequence(s), although in practice the hardware computes the distances as it normally would. The computed distance is overridden by the large pruning value. The decoded bit sequence is selected from only those possible bit sequences that conform to constraints such as those identified above or other physical constraints associated with the data.

Figure 12:
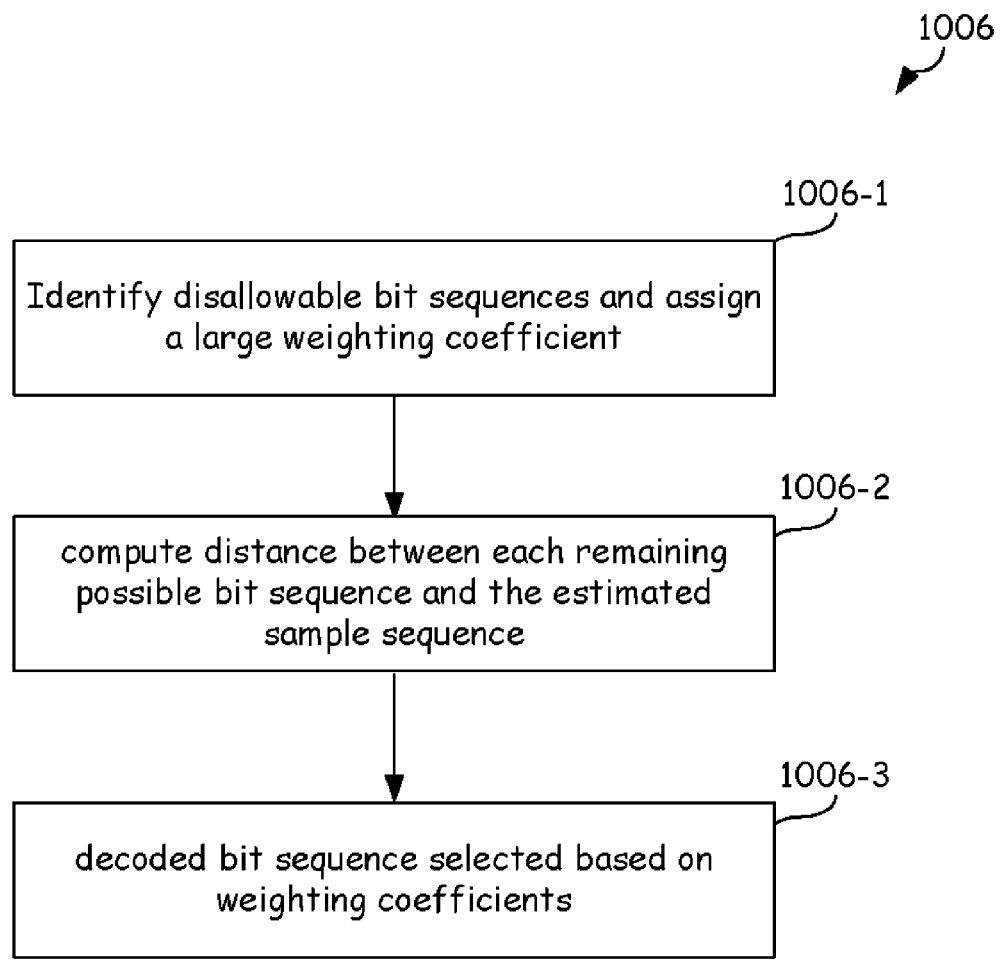
FIG. 12 describes how dis-allowed bit sequences may be reprioritized (pruned) from the set of possible bit sequences in accordance with embodiments of the present invention.

Comparing the estimated sample sequence to all possible sample sequences may be divided into multiple steps. As shown in FIG. 12, Step 1006 is divided into multiple steps. In step 1006-1 possible bit sequences that are dis-allowed are identified and assigned a large weighting coefficient. The identification of dis-allowed bit sequences can be based on physical constraints imposed by the data sector to limit the number of allowed bit sequences. Step 1006-2 computes the distance between each remaining possible bit sequence and the sample sequence. A weighting coefficient could then be assigned to each remaining possible bit sequence based on the computed distance in step 1006-2. In step 1006-3, the decoded bit sequence may be selected from the set of possible bit sequences as the possible bit sequence having the least distance from the sample sequence.

In summary, embodiments of the present invention provide a method that leverages knowledge of the actual or ideal bit sequence to improve the performance of any sequence detector, such as but not limited to a Viterbi Algorithm, a "Soft-Output Viterbi Algorithm (SOVA)" or Bahl, Cocke, Jelinek, and Raviv (BCJR) detector. This improved performance results by constraining the sequence detector when the sequence detector has knowledge of known patterns within the sample sequence. One set of embodiments control or limit the effects of ISI on a communication signal in order to allow higher data exchange rates within a communication channel. This method involves reading an analog waveform from the physical media. The phase of this analog waveform is determined and it is sampled at regular intervals. This sample sequence is equalized (filtered) and sent to a sequence detector which will compare the received sequence to all possible transmitted sequences, generating a path through a trellis that represents the estimated sequence. That trellis path may pass through known states at certain times. For example, the known bit sequence may include a preamble, training sequence, data, and postamble. Knowledge of the ideal bit sequences at certain time instances makes it possible to remove some of the paths under consideration, hence improving performance of the sequence detector. Any dis-allowed bit sequences may be pruned from the set of possible bit sequences based on knowledge of the ideal bit sequence. Then the sample sequence may be compared to a set of possible bit sequences to select a decoded bit sequence.

Figure 13:
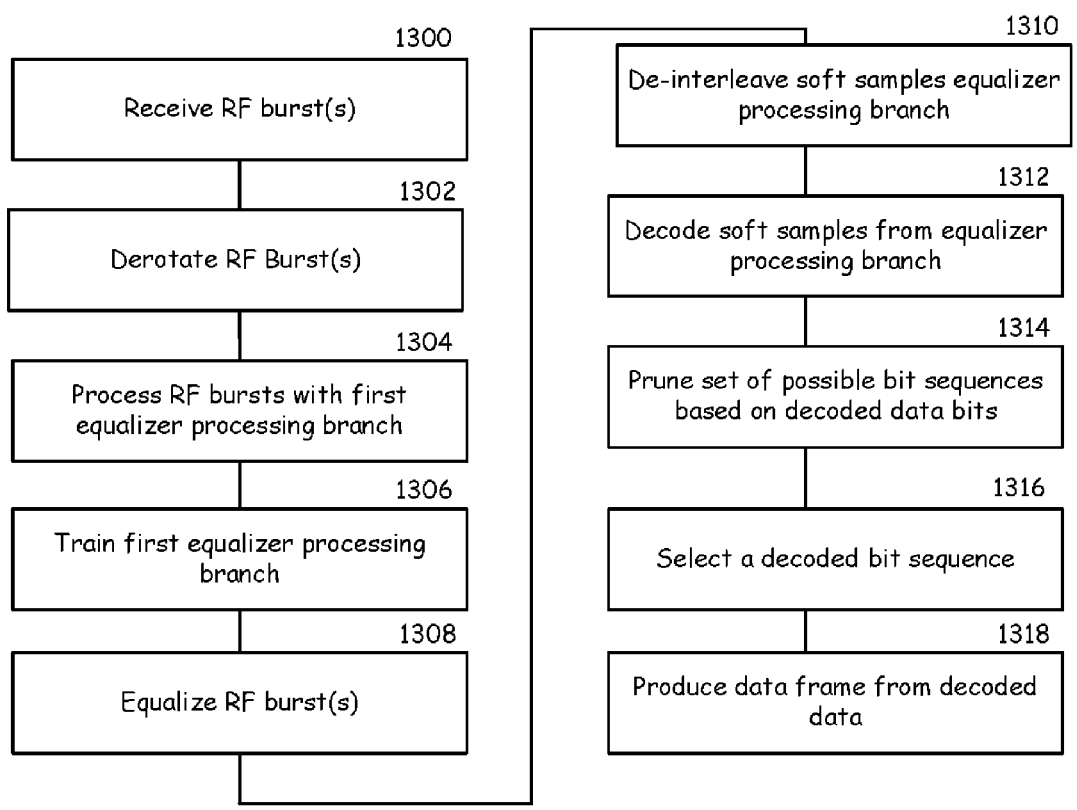
FIG. 13 is a flow chart illustrating operation according to an embodiment of the present invention.

FIG. 13 provides a logic flow diagram illustrating one embodiment of equalizing received RF burst(s). This involves a step 6 1300 receiving a number of burst(s), which are then de-rotated as previously described in step 1302. In step 1304, processing the RF burst(s) with a first equalizer, such as the first equalizer processing branch, of FIG. 9 which is trained using the known training sequence in step 1306. The received RF bursts may be supplied to an equalizer processing branch. The equalizer processing branch equalizes the received RF burst in step 1308 using filters that have been trained based on a known training sequence. This equalized RF burst produces a series of samples or soft decisions which are de-interleaved in step 1310 and decoded in step 1312 to yield extracted data bits. These data bits may be used by a decoder to prune a set of possible bit sequences in step 1314. In step 1316 the decoded bit sequence is selected. In the case of a voice frame, this requires that the data from the current set of RF burst(s) be combined with that of a previous set of RF bursts to produce a valid voice frame. The voice frame may them be re-encoded to produce re-encoded data bits.

In summary, the present invention provides for the feedback of reinterleaved correctly decoded data blocks to a decoder is provided for use in channel decoding operations of channel coded word containing data block. Once a properly decoded data block has been determined, feedback of constraints on the estimated bit sequences decoded data characteristics to a turbo decoder assist in additional decoding operations. Estimated bit sequences may be selected from those trellises that pass through the constraint imposed by knowledge of re-interleaving properly decoded data blocks. This allows the decoder to generate solutions having a minimum probability of error that are also confined by the re-interleaved properly decoded data blocks.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

What is claimed is:

1. A channel decoder processing module operable to provide enhanced decoding results, comprising:
   a wireless input for receiving a radio frequency (RF) burst, including data encoded therein, from a wireless communication channel;
   an equalizer processing module operable to:
      equalize the RF burst; and
      extract an interleaved estimated bit sequence from the equalized RF burst, the RF burst including at least one predetermined bit sequence; and
   a decoder processing module operable to:
      decode the interleaved estimated bit sequence using a trellis thereby generating a set of possible bit sequences corresponding to the encoded data;
      prune a plurality of dis-allowed bit sequences from the set of possible bit sequences based on knowledge of the at least one respective predetermined bit sequence within the interleaved estimated bit sequence thereby generating a reduced set of possible bit sequences; and
      compare the interleaved estimated bit sequence to the reduced set of possible bit sequences to select a decoded bit sequence corresponding to the encoded data, wherein the decoded bit sequence being one possible bit sequence within the reduced set of possible bit sequences.

2. The Channel Decoder of claim 1, wherein the interleaved estimated bit sequence comprises:
   a preamble, synchronization (sync) mark, data and a postamble.

3. The Channel Decoder of claim 2, wherein pruning the set of possible bit sequences further comprises:
   pruning the set of possible bit sequences based on the preamble, wherein the preamble comprises first predetermined bit sequences;
   pruning the set of possible bit sequences based on the sync mark, wherein the sync mark comprises second predetermined bit sequences;
   pruning the set of possible bit sequences based on parity of at least one data code word within the data; and
   pruning the set of possible bit sequences based on the postamble, wherein the postamble comprises third predetermined bit sequences.

4. The Channel Decoder of claim 3, wherein pruning the set of possible bit sequences based on the preamble further comprises pruning based on parity of the preamble.

5. The Channel Decoder of claim 3, wherein pruning the set of possible bit sequences based on parity of at least one data code word within the data further comprises pruning the set of possible bit sequences based on parity of a plurality of data code words within the data.

6. The Channel Decoder of claim 1, wherein the decoder processing module reprioritizing the plurality of dis-allowed bit sequences within the set of possible bit sequences.

7. The Channel Decoder of claim 1, wherein the decoder processing module comparing the interleaved estimated bit sequence to the reduced set of possible bit sequences to select the decoded bit sequence by applying a sequence detector selected from the group consisting of the Viterbi Algorithm, a Soft-Output Viterbi Algorithm (SOVA) or BCJR detector.

8. The Channel Decoder of claim 1, further comprising:
a deinterleaver; and
a channel decoder, wherein the combination of the deinterleaver and channel decoder operably coupled to the decoder processing module and at least one additional decoder processing module and is operable to:
decode a frame that includes the selected decoded bit sequence.

9. The Channel Decoder of claim 8, wherein the frame and an alternate frame are speech frame(s).

10. The Channel Decoder of claim 8, wherein the frame and an alternate frame are data frame(s).

11. The Channel Decoder of claim 1, wherein the RF burst includes Gaussian Minimum Shift Keying (GMSK) symbols carrying the data bits and interfering Eight Phase Shift Keying (8PSK) symbols.

12. A wireless terminal that comprises:
a Radio Frequency (RF) front end operable to receive an RF burst, including data encoded therein, from a wireless communication channel;
a baseband processor communicatively coupled to the RF front end, wherein the baseband processor and RF front end are operable to produce a baseband signal from the RF burst; and
a multi-branch equalizer processing module operably coupled to the baseband processor, wherein the multi-branch equalizer processing module further comprises:
an equalizer interface that receives the baseband signal from the baseband processor, and outputs soft decisions based on the baseband signal; and
a plurality of equalizer processing branches each being operable to:
equalize the received RF burst, the RF burst including at least one predetermined bit sequence, thereby generating respective equalized received RF bursts; and
extract respective interleaved data bits from its respective equalized received RF burst;
a decoder processing module operable to:
decode each of the respective interleaved data bits using a trellis thereby generating a set of possible bit sequence corresponding to the encoded data;
prune a plurality of dis-allowed bit sequences from the set of possible bit sequences based on knowledge of the at least one predetermined sequence thereby generating a reduced set of possible bit sequences;
compare the respective interleaved data bits to the reduced set of possible bit sequences to select a decoded bit sequence, wherein the decoded bit sequence comprises a data frame and the decoded bit sequence being one possible bit sequence within the reduced set of possible bit sequences.

13. The wireless terminal of claim 12, wherein the data frame being a speech frame.

14. The wireless terminal of claim 12, wherein the data frame being a data frame.

15. The wireless terminal of claim 12, wherein the RF burst include Gaussian Minimum Shift Keying (GMSK) symbols carrying the data bits and interfering Eight Phase Shift Keying (8PSK) symbols.

16. The wireless terminal of claim 12, wherein each of the respective interleaved data bits respectively comprises:
a preamble, synchronization (sync) mark, data and postamble.

17. The wireless terminal of claim 16, wherein pruning the set of possible bit sequences further comprises:
pruning the set of possible bit sequences based on the preamble, wherein the preamble comprises first predetermined bit sequences;
pruning the set of possible bit sequences based on the sync mark, wherein the sync mark comprises second predetermined bit sequences;
pruning the set of possible bit sequences based on parity of at least one data code word within the data; and
pruning the set of possible bit sequences based on the postamble, wherein the postamble comprises third predetermined bit sequences.

18. The wireless terminal of claim 17, wherein pruning the set of possible bit sequences based on the preamble further comprises pruning based on parity of the preamble.

19. The wireless terminal of claim 17, wherein pruning the set of possible bit sequences based on parity of at least one data code word within the data further comprises pruning the set of possible bit sequences based on parity of a plurality of data code words within the data.

20. The wireless terminal of claim 16, wherein the decoder processing module reprioritizing the plurality of dis-allowed bit sequences within the set of possible bit sequences.

21. The wireless terminal of claim 16, wherein the decoder processing module comparing the respective interleaved data bits to the reduced set of possible bit sequences to select the decoded bit sequence by applying a sequence detector selected from the group consisting of the Viterbi Algorithm, a Soft-Output Viterbi Algorithm (SOVA) or BCJR detector.

22. A method for operating a communication device, the method comprising:
via a wireless input, receiving a radio frequency (RF) burst, including data encoded therein, from a wireless communication channel;
operating an equalizer processing module for:
equalizing the RF burst; and
extracting an interleaved estimated bit sequence from the equalized RF burst, the RF burst including at least one predetermined bit sequence; and
operating a decoder processing module for:
decoding the interleaved estimated bit sequence using a trellis thereby generating a set of possible bit sequences corresponding to the encoded data;
pruning a plurality of dis-allowed bit sequences from the set of possible bit sequences based on knowledge of the at least one respective predetermined bit sequence within the interleaved estimated bit sequence thereby generating a reduced set of possible bit sequences; and
comparing the interleaved estimated bit sequence to the reduced set of possible bit sequences to select a decoded bit sequence corresponding to the encoded data, wherein the decoded bit sequence being one possible bit sequence within the reduced set of possible bit sequences.

23. The method of claim 22, wherein the interleaved estimated bit sequence comprises:
   a preamble, synchronization (sync) mark, data and postamble.

24. The method of claim 23, wherein the pruning the set of possible bit sequences further comprising:
   pruning the set of possible bit sequences based on the preamble, wherein the preamble comprises first predetermined bit sequences;
   pruning the set of possible bit sequences based on the sync mark, wherein the sync mark comprises second predetermined bit sequences;
   pruning the set of possible bit sequences based on parity of at least one data code word within the data; and
   pruning the set of possible bit sequences based on the postamble, wherein the postamble comprises third predetermined bit sequences.

25. The method of claim 24, wherein pruning the set of possible bit sequences based on the preamble further comprising pruning based on parity of the preamble.

26. The method of claim 24, wherein pruning the set of possible bit sequences based on parity of at least one data code word within the data further comprises pruning the set of possible bit sequences based on parity of a plurality of data code words within the data.

27. The method of claim 22, further comprising operating the decoder processing module for reprioritizing the plurality of dis-allowed bit sequences within the set of possible bit sequences.

* * * * *